(12) United States Patent
Edwards et al.

(10) Patent No.: US 11,475,471 B2
(45) Date of Patent: Oct. 18, 2022

(54) METHODS AND SYSTEMS FOR DIRECTING TRANSACTION REWARDS

(71) Applicant: Capital One Services, LLC, McLean, VA (US)

(72) Inventors: Joshua Edwards, Philadelphia, PA (US); Michael Mossoba, Arlington, VA (US); Abdelkader Benkreira, New York, NY (US); Matthew Carson, Mountain View, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/996,557

(22) Filed: Aug. 18, 2020

(65) Prior Publication Data

US 2022/0058677 A1    Feb. 24, 2022

(51) Int. Cl.
*G06Q 30/02* (2012.01)
*G06N 20/00* (2019.01)
(Continued)

(52) U.S. Cl.
CPC ........ *G06Q 30/0215* (2013.01); *G06N 5/04* (2013.01); *G06N 20/00* (2019.01);
(Continued)

(58) Field of Classification Search
CPC .................................................. G06Q 30/02
See application file for complete search history.

(56) References Cited

U.S. PATENT DOCUMENTS 8,010,450 B2 * 8/2011 Palmer ............... G06Q 20/10
705/39
10,991,015 B2 * 4/2021 Soderstrom ........ G06Q 40/02
(Continued)

FOREIGN PATENT DOCUMENTS

CA         2880931 A1 *  8/2015 ............ G06Q 30/02
WO  WO 2014/205552 A1 * 12/2014 ............ G06Q 30/02

OTHER PUBLICATIONS

Centralized Payment System Using Social Networks Account, 2014 IEEE Fourth International conference on Big Data an Cloud Computing (Year: 2014).*
(Continued)

*Primary Examiner* — Marilyn G Macasiano
(74) *Attorney, Agent, or Firm* — Bookoff McAndrews, PLLC

(57) ABSTRACT

A computer-implemented method for directing transaction rewards may comprise receiving, via a user device associated with a user, user preference data regarding a preferred merchant list including one or more merchants and reward criteria for each of the merchants, wherein the preferred merchant list defines a priority of the one or more merchants and the reward criteria defines a dynamic reward for each of the one or more merchants based on the priority on the preferred merchant list; receiving transaction information from a first merchant; determining, via one or more processors, if the first merchant is one of the one or more merchants on the preferred merchant list; and in response to determining the first merchant is on the preferred merchant list, determining, via one or more processors, a reward based on the transaction information; and transmitting, via the one or more processors, the reward to the first merchant.

20 Claims, 4 Drawing Sheets

(51) Int. Cl.
*G06N 5/04* (2006.01)
*G06Q 40/02* (2012.01)

(52) U.S. Cl.
CPC ..... *G06Q 30/0205* (2013.01); *G06Q 30/0279* (2013.01); *G06Q 40/02* (2013.01)

(56) References Cited

U.S. PATENT DOCUMENTS

| | | | |
|---|---|---|---|
| 2006/0231608 A1* | 10/2006 | Gorelick | G06Q 20/381 |
| | | | 235/379 |
| 2015/0006426 A1 | 1/2015 | Sobhani et al. | |
| 2018/0276710 A1 | 9/2018 | Tietzen et al. | |
| 2019/0147483 A1* | 5/2019 | Monaco | G06Q 30/0235 |
| | | | 705/14.34 |

OTHER PUBLICATIONS

Method and system for processing customized reward offers to e-commerce buyers (English (United States)), The IP.com Prior Art Database, Nov. 8, 2000 (Year: 2000).*

* cited by examiner

METHODS AND SYSTEMS FOR DIRECTING TRANSACTION REWARDS

TECHNICAL FIELD

Various embodiments of the present disclosure relate generally to rewarding a merchant, and, more particularly, to directing one or more rewards to one or more merchants based on transaction information.

BACKGROUND

Customers often make decisions to help certain merchants (e.g., charitable organizations) even though they are not the most financially advantageous decisions for the customers themselves. Indeed, if customers make payments to such merchants, customers may need to pay additional fees because of interchange rates.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for negotiating a price of a product for a user.

In an aspect, a computer-implemented method for directing transaction rewards may comprise receiving, via a user device associated with a user, user preference data regarding one or more merchants; receiving transaction information from a first merchant; determining, via one or more processors, a reward based on the transaction information; and if the first merchant is one of the one or more merchants, transmitting, via the one or more processors, the reward to the first merchant.

In another aspect, a computer-implemented method for directing transaction rewards may comprise receiving transaction information associated with a transaction between a user and a merchant; determining, via one or more processors, a reward associated with the transaction; receiving a user instruction, via a user device associated with the user, to direct the reward to the merchant; and transmitting, via the one or more processors, the reward to the merchant.

In yet another aspect, a computer system for directing transaction rewards may include a memory storing instructions; and one or more processors configured to execute the instructions to perform operations. The operations may include receiving transaction information associated with a transaction between a user and a merchant; determining, via one or more processors, a reward associated with the transaction; receiving a user instruction, via a user device associated with the user, to direct the reward to the merchant; and transmitting, via the one or more processors, the reward to the merchant.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as user preference data and transaction information may be used to determine a reward transmitted to one or more merchants. A user then may confirm directing the reward to the one or more merchants.

Figure 1:
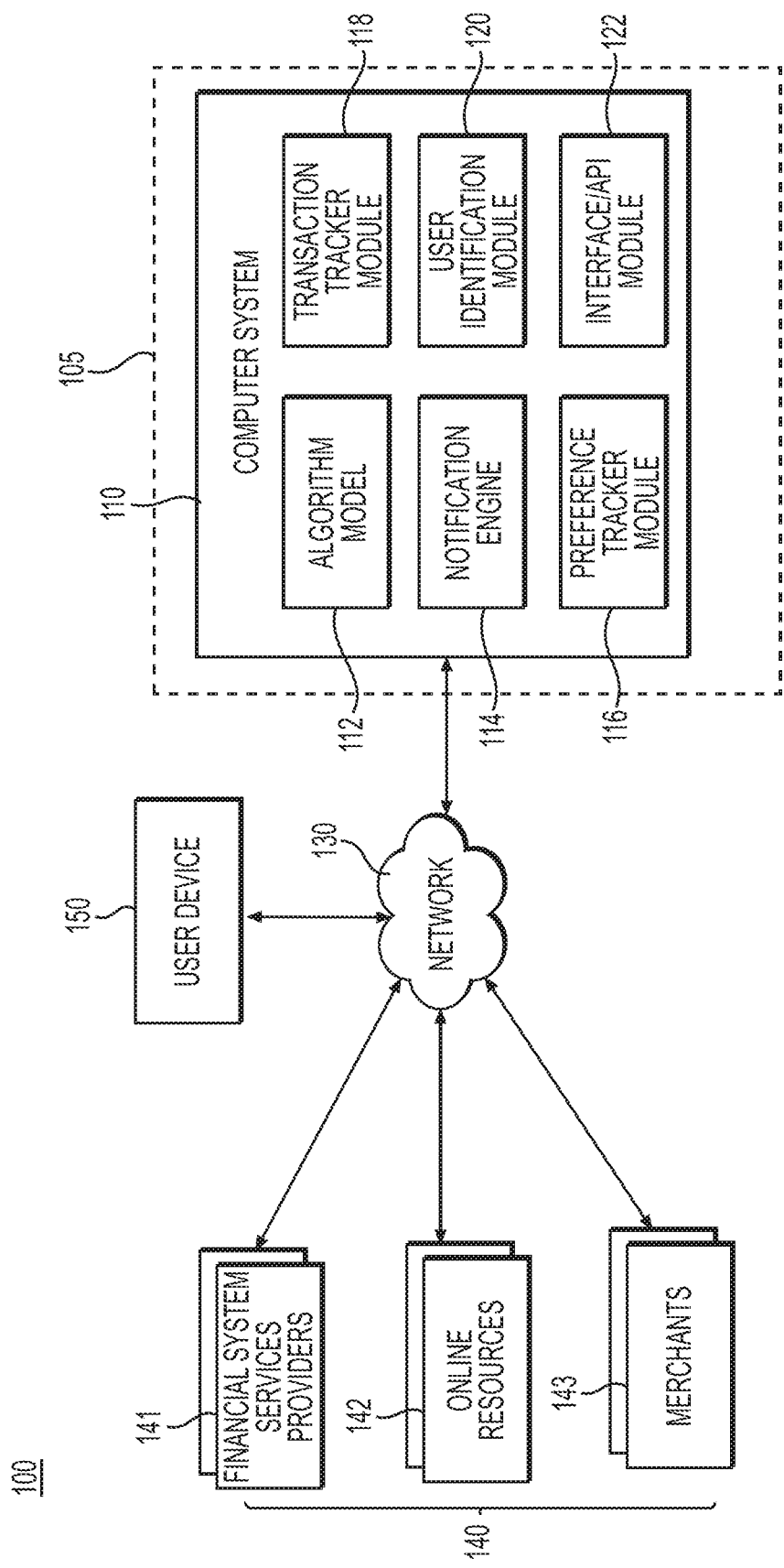
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources 140 for collecting data (e.g., transaction information, user preference data, and/or user instructions) and/or transmitting a reward, and a user device 150. The one or more resources 140 for collecting data and/or transmitting a reward may include financial services providers 141, online resources 142, and/or merchants 143. These components may be connected to, or otherwise in communication with, one another via the network 130.

The computer system 110 may have one or more processors configured to perform methods described in this disclosure. The computer system 110 may include one or more modules, models, or engines. The one or more modules, models, or engines may include an algorithm model 112, a notification engine 114, a preference tracker module 116, a transaction tracker module 118, a user identification module 120, or an interface/API module 122, which may each be software components stored via, or otherwise available to, the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others are added.

The algorithm model 112 may be a plurality of algorithm models. The algorithm model 112 may include a trained machine learning model. Details of algorithm model 112 are described elsewhere herein. The notification engine 114 may be configured to generate and communicate (e.g., transmit) one or more notifications to a user device 150 through the network 130. The preference tracker module 116 may be configured to monitor or track various user preference data. Details of the user preference data are described elsewhere herein. The transaction tracker module 118 may be configured to monitor or track transaction information. The transaction tracker module 118 may retrieve, store, or otherwise aggregate or manage current or historical transaction or purchase data or information from financial services providers 141, online resources 142, and/or merchants 143. Details of transaction information are described elsewhere herein. The user identification module 120 may manage identification information for each user accessing the computer system 110, possibly including, but not limited to, actual names, usernames, passwords, contact information, and additional information pertaining to the user. The identification information may further include user preference information, demographic information, previous purchase information, and other data related to the particular user. In one implementation, the identification information associated with each user may be stored to, and retrieved from, one or more components of data storage associated with the computer system 110. The interface/API module 122 may allow the user or merchant to interact with one or more modules, models, or engines of the computer system 110.

Computer system 110 may be configured to receive data from other components (e.g., financial services providers 141, online resources 142, merchants 143, and/or a user device 150) of the system environment 100 through network 130. Computer system 110 may further be configured to utilize the received data by inputting the received data into the algorithm model 112 to produce a result. Information indicating the result may be transmitted to a user device 150 over the network 130. In some examples, the computer system 110 may be referred to as a server system that provides a service including providing the information indicating the result to a user device 150.

Network 130 may be any suitable network or combination of networks and may support any appropriate protocol suitable for communication of data to and from the computer system 110. Network 130 may include a public network (e.g., the Internet), a private network (e.g., a network within an organization), or a combination of public and/or private networks. The network 130 may comprise one or more networks that connect devices and/or components of the environment 100 to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the environment 100. In some embodiments, the network may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants 143 with the ability to accept electronic payments, such as payments using credit cards and debit cards. Therefore, financial services providers 141 may collect and store transaction information, user preference data, and/or user instructions, and transmit a reward pertaining to transactions occurring at the merchants 143.

Online resources 142 may include webpage, e-mail, apps, or social network sites. In details, online resources 142 may include electronic transaction data (e.g., electronic receipts) held by a user or other parties. Online resources 142 may be provided by manufacturers, retailers, consumer promotion agencies, and other entities. Online resources 142 may include other computer systems, such as web servers, that are accessible by computer system 110. The online resources 142 may be configured to provide any information regarding a user and/or a transaction, including, but not limited to, a user's profile (e.g., gender, age, social status, list of friends, contacts, calendar, etc.), user's preferences (e.g., hobbies, aspirations, etc.), a time stamp, a geographic location, a transaction amount, a product of the transaction, a discount of the transaction, or any historical or real-time transaction information regarding the transaction.

Merchants 143 may each be an entity that provides products. In this disclosure, the term "product," in the context of products offered by a merchant, encompasses both goods and services, as well as products that are a combination of goods and services. A merchant may be, for example, a retailer, a grocery store, an entertainment venue, a service provider, a restaurant, a bar, a non-profit organization, a charitable organization, or other type of entity that provides products that a consumer or a user may consume. A merchant 143 may have one or more venues that a consumer or a user physically visits in order to obtain the products (goods or services) offered by the merchant. A merchant 143 may be the merchant (e.g., the first merchant) that a user directs a reward to.

The merchants 143 and financial services providers 141 may each include one or more computer systems configured to gather, process, transmit, and/or receive data. In general, whenever any of the merchants 143 and financial services providers 141 is described as performing an operation of gathering, processing, transmitting, or receiving data, it is understood that such operation may be performed by a computer system thereof. In general, a computer system may include one or more computing devices, as described in connection with FIG. 4, below.

User device 150 (or a device associated with the user) may operate a client program, also referred to as a user application, used to communicate with the computer system 110. This user application may be used to provide information to the computer system 110 and to receive information from the computer system 110. In some examples, the user application may be a mobile application that is run on the user device 150. User device 150 may be an electronic mobile device (e.g., smartphone, tablet, pager, personal digital assistant (PDA)), a computer (e.g., laptop computer, desktop computer, server), or a wearable device (e.g., smartwatches). User device 150 can also include any other device capable of providing or rendering data. User device 150 may optionally be portable. User device 150 may be handheld. User device 150 may be a network device capable of connecting to a network, such as the network 130, or other networks such as a local area network (LAN), wide area network (WAN) such as the Internet, a telecommunications network, a data network, or any other type of network. User device 150 may be utilized to obtain identification of the user and/or authenticate the user.

Computer system 110 may be part of entity 105, which may be any type of company, organization, or institution. In some examples, the entity 105 may be a financial services provider. In such examples, the computer system 110 may have access to data pertaining to consumer transactions through a private network within the entity 105. For example if the entity 105 is a card issuer, entity 105 may collect and store transactions involving a credit card or debit card issued by the entity 105. In such examples, the computer system 110 may still receive transaction information from other financial services providers 141.

Figure 2:
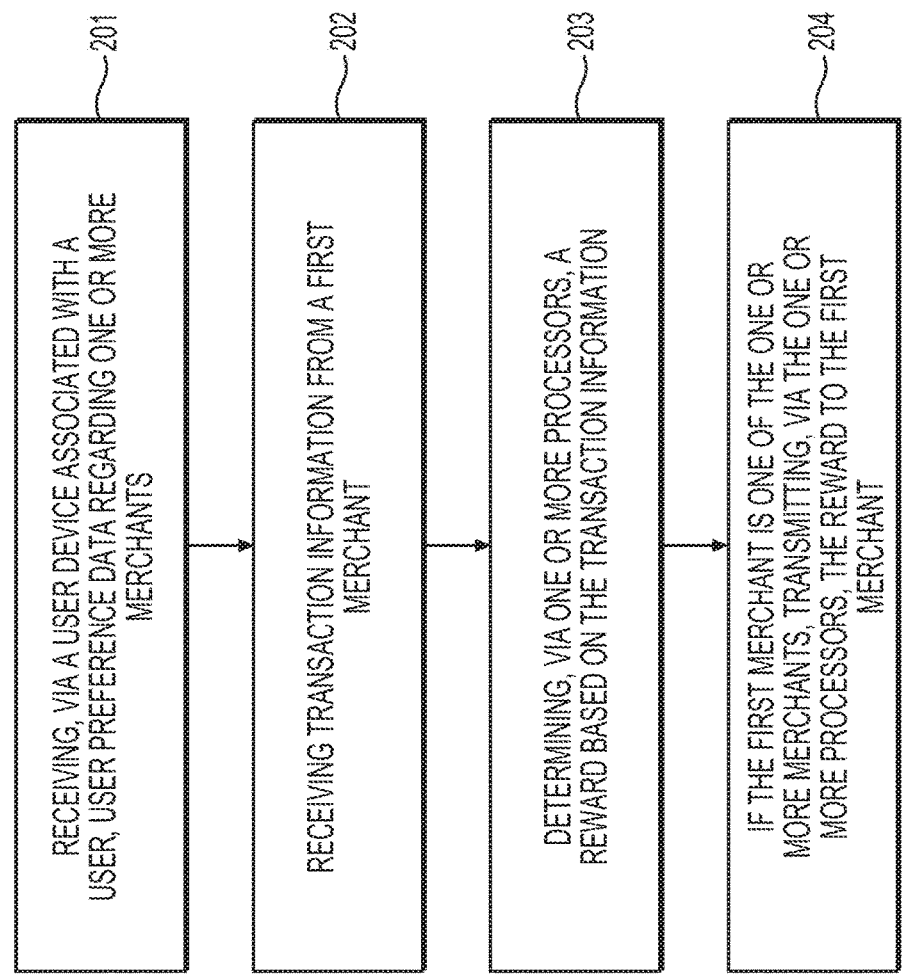
FIG. 2 depicts a flowchart of an exemplary method of directing transaction rewards, according to one or more embodiments.

FIG. 2 is a flowchart illustrating a method 200 for directing transaction rewards, according to one or more embodiments of the present disclosure. The method may be performed by computer system 110.

Step 201 may include receiving, via a user device associated with a user (e.g., user device 150), user preference data regarding a preferred merchant list including one or more merchants (e.g., merchants 143). The preferred merchant list may be dynamically populated and determined based on merchant criteria personalized by a user (e.g., via user device 150). Details of the user device associated with the user (or a user device 150) and the merchant criteria determining the preferred merchant list are described elsewhere herein. The user preference data may be obtained by allowing the user to click on one or more selections displayed on a display of the user device 150. The one or more selections may be in the form of a link, button, or hyperlink. The one or more selections may define the merchant criteria, and may include a selection of a type of a merchant (e.g., a non-profit organization), a selection of an entity size of a merchant (e.g., a small entity with less than 50 employees), or a selection of a geographic location of the merchant (e.g., a geographic location within a specified distance of the user, a user's preferred geographic location, and/or a geographic location associated with the user). For example, the display of the user device 150 may display a plurality of buttons including merchant type buttons, entity size buttons, and geographic location buttons. After the user selects the merchant type, entity size, and/or geographic location (collectively referred to herein as the merchant criteria), a list of merchants 143 may be displayed on the display of the user device 150. In some embodiments, the one or more selections may include a plurality of merchants 143, so a user may interact with the one or more selections to select a preferred merchant list of one or more merchants from a list of merchants to which the user wants to transmit a reward. In some embodiments, the one or more selections of the preferred merchant list may be selected via an algorithm model (e.g., algorithm model 112). In this case, the plurality of merchants may be systematically or algorithmically chosen and presented on the display of the user device based on the algorithm model 112. Details of the algorithm model are described elsewhere herein.

The user preference data regarding the one or more merchants 143 may include reward criteria that defines a user preference to credit the one or more merchants 143 on the preferred merchant list with the reward. The user preference to credit the one or more merchants 143 with the reward may include a list of merchants (e.g., the preferred merchant list) that the user wants to give a reward to and/or a ranking of the one or more merchants to which the user wants to give the reward. The reward may be divided evenly or unevenly (e.g., according to user preference or a priority/ranking of the one or more merchants 143 in the preferred merchant list), and then may be transmitted to the one or more merchants based on their rankings. For example, the user may first select three different merchants, one non-profit organization, one local store, and one charitable organization, as his/her preference; and then rank the non-profit organization as the first merchant, the local store as the second merchant, and the charitable organization as the third merchant. In this situation, the user may also define the reward criteria such that 50% of the reward may be given to the first merchant, 30% of the reward may be given to the second merchant, and 20% of the reward may be given to the third merchant. In this instance, the reward may be dynamic and at least partially based on a priority/ranking of the merchant 143 in the preferred merchant list. In some arrangements, if the user does not wish to or fails to identify a preferred percentage to respective selected merchants, then the reward criteria may be configured to split a reward approximately evenly. For instance, continuing the example above, the reward may be allocated such that each of the first merchant, second merchant, and third merchant may receive approximately 33.33% of the reward. In some embodiments, the user preference to credit the one or more merchants 143 with the reward may include reward criteria for providing the reward to a given merchant of the one or more merchants 143 based on a transaction performed at the given merchant. For instance, a user may spend transaction amount X at merchant A transaction amount Y at merchant B, then the reward to merchant A may be determined based on transaction amount X, and the reward to the merchant B may be determined based on transaction amount Y. In this instance, the reward may be dynamic and at least partially based on a transaction amount at the merchant 143. The user preference to credit the one or more merchants 143 with the reward may also include reward criteria defining a user preferred type of the reward. The user preferred type of the reward may include a real-time discount of the interchange fees, which is applied to a transaction when the user is performing the transaction. In this situation, the reward may be provided to a given merchant of the one or more merchants 143 based on a transaction performed at the given merchant. The user preferred type of the reward may include a credit of the interchange fees, which is applied to a transaction after the user finishes the transaction.

The user preference data may further include merchant criteria for determining the one or more merchants 143 included in the preferred merchant list and/or a ranking/priority of the one or more merchants 143 in the preferred merchant list. For example, the merchant criteria may include a threshold income limit of the merchant 143. The one or more merchants 143 may be one or more businesses, each of the one or more business included in the preferred merchant list having an annual income below a threshold income limit. The merchant criteria may be personalized by a user such that the threshold income limit may be any income set by a user or dynamically updated to change via an algorithm model (e.g., algorithm model 112). The threshold income limit may be determined based on the geographic location of the business, the demographic information of the people who reside in the geographic location, the type of the merchant (e.g., a charitable organization), or any geographic information of the geographic location.

The merchant criteria for determining the one or more merchants 143 included in the preferred merchant list and/or a ranking/priority of the one or more merchants 143 in the preferred merchant list may further include a predefined geographic region of (or a threshold distance) the merchant 143. The one or more merchants may include businesses, each of the one or more businesses included in the preferred merchant list being located within a predefined geographic region or within a threshold distance from a residence of the user. The merchant criteria may be personalized by a user such that the threshold distance may be any distance set by a user or dynamically updated to change via an algorithm model (e.g., algorithm model 112). The residence of the user may include an address of the user. The residence of the user may be obtained by identifying the geographic location of the user via a user device (e.g., user device 150). The user device may comprise memory storage that stores user's geographic location (e.g., residence location, current user location, etc.) periodically. The residence location of the user may include a location that the user visits or stays regularly, including, for instance, a residence location, an employment location, a fitness center, a coffee shop, a library, a restaurant, or a shopping destination location associated with the user. The threshold distance may be at least 1 mile, 5 miles, 10 miles, 15 miles, 20 miles, 25 miles, 30 miles, 35 miles, 40 miles or longer. In some other embodiments, the threshold distance may be at most 40 miles, 35 miles, 30 miles, 25 miles, 20 miles, 15 miles, 10 miles, 5 miles or shorter. The one or more merchants 143 may be charitable organizations or local stores. The one or more merchants may include the first merchant, as described elsewhere herein. In some embodiments, the one or more merchants may not include the first merchant.

Step 202 may include receiving transaction information from a first merchant. The transaction information may include a transaction amount. The transaction information may include any information regarding a transaction, for example, a customer name and/or identifier, contact information (e.g., address, phone numbers, e-mail addresses, etc.), demographic information (e.g., age, gender, marital status, income level, educational background, number of children in household, etc.), user preferences (preferences or reviews regarding favorite products and/or services, favorite department stores, etc.), and previous transaction information. The previous transaction information may include a time of a transaction, a location of a transaction, a spending profile of a user, past spending levels on goods sold by various manufacturers or merchants, a frequency of shopping by the user at one or more merchants, store loyalty exhibited by the user, how much the user spends in an average transaction, how much the user has spent on a particular basket of goods, how often the user shops in a particular store or kind of merchant, an estimated profit margin on goods previously purchased, distances the user has traveled to purchase products in past outings, and/or online or offline stores at which the user has purchased items. The first merchant may be any merchant that a user wants to transmit a reward to, such as a charitable organization or local store.

The receiving transaction information may include receiving transaction information from a first merchant or a transactional entity associated with the first merchant over a network (e.g., network 130). The transaction information may be stored or analyzed via the transaction tracker module 118. The transactional entity may include financial services providers 142 or online resources 143. For instance, the computer system 110 may obtain transaction information involving financial services providers 141 over a financial network. If the entity 105 operating the computer system 110 is a card issuer or other financial services provider that is involved in processing payment transactions, the computer system 110 may have access to such transaction information directly or through a private network within entity 105, and may utilize such information in addition to or alternatively to information from other financial services providers 141.

Prior to step 201 or at any stage of directing transaction rewards, there may be a step of authenticating the user based on an identification of the user. The step of authenticating the user may be performed by the user identification module 120. The authenticating the user may be initiated when an identification of the user is obtained. The identification of the user may include any information associated with the user, including, but not limited to, a name, a password, contact information, a social security number, an e-mail address, or an address of the user. The authenticating the user may include comparing the identification of the user to a prestored identification. During the authenticating process, one or more algorithms may be used to compare the identification of the user to a prestored identification and determine whether there is a match between the identification of the user and a prestored identification. A transaction process may be permitted to be completed, may be stopped, or may require additional verification processes, based on whether there is a match between the identification of the user and the prestored identification. In some embodiments, rewards may be permitted to be transmitted to the first merchant based on whether there is a match between the identification of the user and the prestored identification.

The prestored identification may be generated when a user device (e.g., user device 150) is registered with a computer system (e.g., computer system 110) or a transactional entity. In some embodiments, the prestored identification may be generated when a user device first connects with a computer system or a transactional entity. If the user device is an electronic mobile device, the prestored identification may be generated when a mobile application for authenticating identification is downloaded, installed, or running on the user device for the first time. The prestored identification may be generated when a user account is registered with a computer system (e.g., computer system 110) or a transaction entity, and the prestored identification may correspond to the user device used for registration of the user account. Once the prestored identification has been generated, it may be stored with other user account information and/or authentication information. The prestored identification may be stored in one or more memory units, cookies, caches, browsing histories, and/or browser fingerprints. The prestored identification may be stored in a memory on-board the user device. The prestored identification may be distributed over multiple devices or systems (e.g., peer-to-peer, cloud-computing based infrastructure, etc.).

Step 203 may include determining, via one or more processors, a reward based on the transaction information.

The reward may be dynamically determined based on the reward criteria described in detail above. For example, the dynamic reward may include a percentage of a transaction amount such that a quantity of the dynamic award may vary relative to the transaction amount. The transaction amount may be a monetary value of a product purchased in a transaction at a merchant. For instance, the reward may be at least about 1%, 1.5%, 2%, 5%, 10%, 20%, 30%, 40%, 50%, 60%, 70%, 80%, 90% or more of the transaction amount. In some cases, the reward may be at most about 90%, 80%, 70%, 60%, 50%, 40%, 30%, 20%, 10%, 5%, 2%, 1.5%, 1% or less of the transaction amount.

The reward may be credited to the first merchant in the form of a credit against interchange fees pursuant to the reward criteria. In this situation, the reward may be credited to the merchant after the user finished the transaction. The reward may be credited to the merchant in the form of a discount price of interchange fees. In this situation, the reward may be credited to the merchant when the user is performing the transaction. The interchange fees may be fees paid between transactional entities (e.g., financial services providers 141) for the acceptance of transactions. The value of the interchange fees may be any percentage (e.g., 1%) of the value of the transaction amount. The value of interchange fees may be higher than the value of the reward. The value of interchange fees may be lower than the value of the reward. If the value of interchange fees exceeds the value of the reward, the reward may be credited against part of the interchange fees. If the value of interchange fees is lower than the value of the reward, part of the reward may be credited against the interchange fees. In this situation, the remaining reward may be canceled or stored for future transactions.

The dynamic reward may be determined or set by the user. For instance, the user may set the reward to be 10% of the transaction amount via the interaction with the device associated with the user. In some embodiments, the dynamic reward may be determined via an algorithm model (e.g., algorithm model 112) based on transaction information. The dynamic reward may be associated with a particular level or degree of engagement between the user and the merchant. For example, if the merchant is a charitable organization, and the user donates to the charitable organization at least once per year, then the level of engagement between the user and the merchant may be high, and the dynamic reward to the merchant may be higher than a reward to another merchant. Additionally, if less than 100% of the reward is credited to a merchant, a percentage of the dynamic reward to be credited to the merchant may be determined by a user or an algorithm model (e.g., algorithm model 112). The percentage of the dynamic reward to be credited to the merchant may be at least 10%, 20%, 30%, 40%, 50%, 60%, 70%, 80%, 90% or more of the reward. In some cases, the percentage of the dynamic reward to be credited to the merchant may be at most about 90%, 80%, 70%, 60%, 50%, 40%, 30%, 20%, 10% or less of the reward.

Step 204 may include, if the first merchant is one of the one or more merchants (e.g., merchants 143), transmitting, via the one or more processors, the dynamic reward to the first merchant. In this situation, the first merchant may be one of the merchants included in the preferred merchant list as selected by the user or dynamically determined by an algorithm model (e.g., algorithm model 112). To perform step 204, the user preference data obtained in step 201 may further include a limiting criteria. The limiting criteria may include one or more of a specified time period, a specified transaction type, or a specified transaction amount. The specified time period may be a time period that, every time a transaction is performed and a reward is determined, the reward is transmitted to the merchant (e.g., the first merchant). For example, the specified time period may be 3 months; thus, during the 3 months, a reward may be determined and transmitted to the first merchant every time the user performs a transaction at the first merchant. The specified time period may be at least 1 day, 1 week, 1 month, 1 quarter, 1 year or longer. In some embodiments, the specified time period may be at most 1 year, 1 quarter, 1 month, 1 week, 1 day or shorter. The reward criteria may further define specified transaction types for awarding the dynamic reward. For example, the specified transaction type may include any transaction type set by the user that may receive the reward. By way of example only, the specified transaction type may include a grocery transaction, apparel transaction, furniture transaction, or appliance transaction. For example, the specified transaction type may be a grocery transaction; thus, for every grocery transaction performed at the first merchant by the user, a reward may be determined and transmitted to the first merchant. The reward criteria may further define specified transaction amounts for awarding the dynamic reward. For example, the specified transaction amount may be a transaction threshold set by the user. If a transaction amount is equal to or above the transaction threshold, then the reward may be transmitted to the first merchant. If a transaction amount is below the transaction threshold, then the reward may not be transmitted to the first merchant or only part of the reward (e.g., as specified by the user and/or the algorithm model 112) may be transmitted to the first merchant.

The reward criteria of the user preference data may further include an on-off status of the first merchant for receiving the reward, a user preferred percentage of the reward kept by the first merchant, or a type of merchant that may receive the reward. The on-off status of the first merchant for receiving the reward may be set by the user or the algorithm model 112. For example, a user or the algorithm model 112 may set an on status for the first merchant for a month, so the first merchant may receive the reward during the month but not receive the reward during other months different from the month. The user preferred percentage of the reward kept by the first merchant may be any percentage of the reward set by the user or the algorithm model 112. In some embodiments, the user preferred percentage of the reward may be at least about 10%, 20%, 30%, 40%, 50%, 60%, 70%, 80%, 90%, or more of the reward. In some cases, the user preferred percentage of the reward may be at most about 90%, 80%, 70%, 60%, 50%, 40%, 30%, 20%, 10%, or less of the reward. The type of merchant may include any type set by the user or the algorithm model 112, including, for example, a charitable organization or a local store.

Prior to step 204, or at any stage of directing transaction rewards, there may be a step of determining, via the one or more processors, that a reward balance associated with the user is equal to, below, or exceeds a predefined reward threshold. In this instance, the predefined reward threshold may be defined as part of the reward criteria of the user preference data. The reward balance may be a monetary value of the total amount of reward (e.g., 10 dollars). If the reward balance associated with the user is equal to or exceeds the predefined reward threshold, the reward may be transmitted to the first merchant. If the reward balance associated with the user is less than the predefined reward threshold, the reward may not be transmitted to the first merchant or only part of the reward may be transmitted to the first merchant. The predefined reward threshold may be set by the user or dynamically determined through the algorithm model 112. If the predefined reward threshold is set by the algorithm model 112, the algorithm model 112 may be a machine learning model. The machine learning model may be trained based on transaction information or user preference data. Details of the machine learning model are described elsewhere herein.

Prior to step 204, or at any stage of directing transaction rewards, there may be a step of determining, via the one or more processors, that the transaction amount is equal to, above, or below a predefined transaction threshold. In this instance, the predefined transaction threshold may be defined as part of the reward criteria of the user preference data. The transaction amount may be a monetary value indicative of how much money the user spends on the transaction (e.g., 10 dollars). If the transaction amount is equal to or below a predefined transaction threshold, the reward may be transmitted to the first merchant. If the transaction amount exceeds a predefined transaction threshold, the reward may not be transmitted to the first merchant or only part of the reward may be transmitted to the first merchant. The predefined transaction threshold may be set by the user or dynamically determined through the algorithm model 112. If the predefined transaction threshold is set by the algorithm model 112, the algorithm model 112 may be a machine learning model. The machine learning model may be trained based on transaction information or user preference data. Details of the machine learning model are described elsewhere herein.

Prior to step 204, or at any stage of directing transaction rewards, there may be a step of determining, via the one or more processors, that an account balance of an account associated with the user is equal to, above, or below a certain threshold. In this instance, the certain threshold may be defined as part of the reward criteria of the user preference data. The account balance may be a monetary value indicative of the amount money in a user account associated with the user (e.g., 100 dollars). If the account balance of an account associated with the user is equal to or below a certain threshold, the reward may not be transmitted to the first merchant or only part of the reward may be transmitted to the first merchant. If the account balance of an account associated with the user exceeds a certain threshold, the reward may be transmitted to the first merchant. The certain threshold may be set by the user or dynamically determined through an algorithm model. If the certain threshold is set by the algorithm model 112. The algorithm model 112 may be a machine learning model. The machine learning model may be trained based on transaction information or user preference data. Details of the machine learning model are described elsewhere herein.

Figure 3:
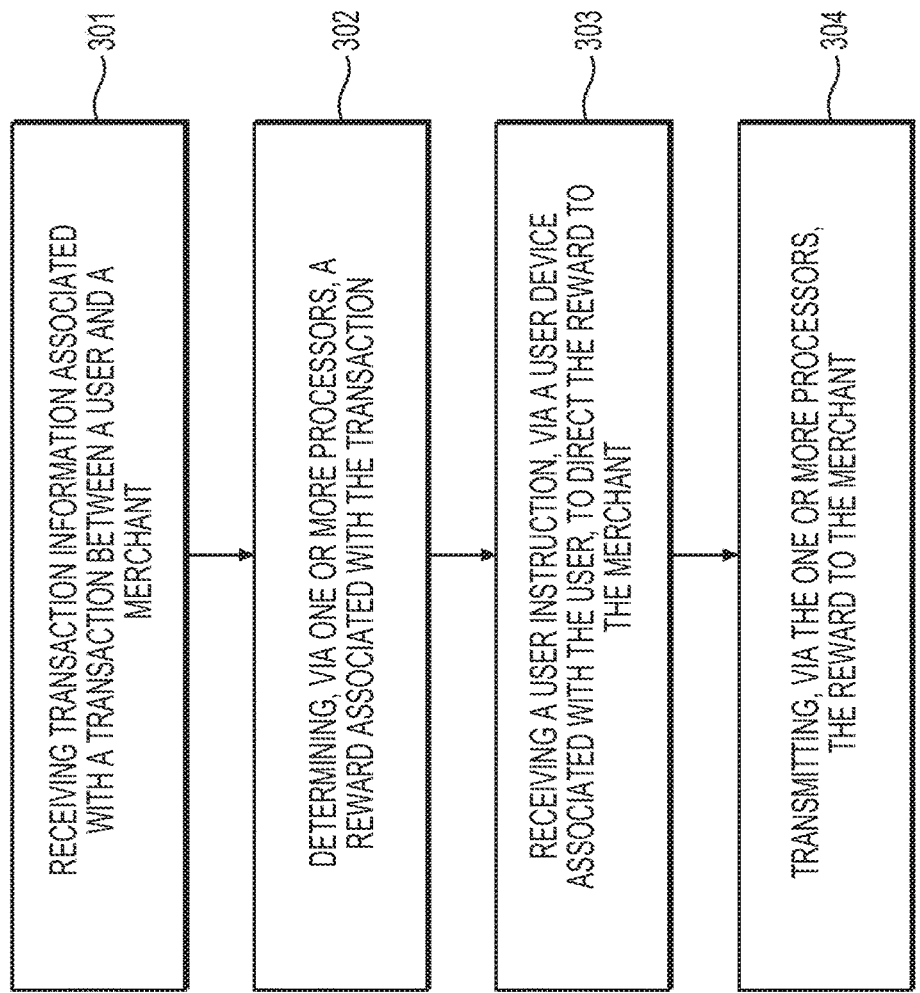
FIG. 3 depicts a flowchart of another exemplary method of directing transaction rewards, according to one or more embodiments.

FIG. 3 is a flowchart illustrating a method 300 for directing transaction rewards, according to one or more embodiments of the present disclosure. The method may be performed by computer system 110.

Step 301 may include receiving transaction information associated with a transaction between a user and a merchant. Details of the transaction information are described elsewhere herein. The transaction information may include a transaction amount. The transaction information may be cryptographically verified (e.g., cryptographically signed) by the transactional entity (e.g., financial services providers 141). The transaction information may be stored by the user device 150 and/or any data storage component or memory system of the computer system 110. The transaction information can be synched (or resynced) among multiple user devices if multiple user devices are used during the process of directing transaction rewards. The stored transaction information may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The transactional entity (e.g., financial services providers 141) may update transaction information periodically. The merchant 143 may include a business with an annual income below an annual income limit. For example, the annual income limit may be at least $1 million, $5 million, $10 million or more. The annual income limit may be at most $10 million, $5 million, or $1 million or less. In some embodiments, the merchant 143 may be a business with an annual income above an annual income limit. The merchant 143 may be a business located within a predefined geographic region or within a threshold distance from a geographic location or residence of the user. In some embodiments, the merchant 143 may be a business located outside of a predefined geographic region or outside a threshold distance from a geographic location or residence of the user. Details of the geographic location or residence of the user and the threshold distance are described elsewhere herein. The merchant 143 may be a charitable organization.

Step 302 may include determining, via one or more processors, a reward associated with the transaction. The reward may be determined by a user. In this situation, the user may look through transaction information and select a reward associated with the transaction based on the transaction information, and the determination may be received via one or more interactive selection features displayed on a display of the user device 150. The reward may be dynamic and in the form of a percentage of a transaction amount. For instance, the reward may be at least about 1%, 1.5%, 2%, 5%, 10%, 20%, 30%, 40%, 50%, 60%, 70%, 80%, 90%, or more of the transaction amount. In some cases, the reward may be at most about 90%, 80%, 70%, 60%, 50%, 40%, 30%, 20%, 10%, 5%, 2%, 1.5%, 1% or less of the transaction amount. The reward may be credited to the merchant in the form of a credit against interchange fees. In this situation, the reward may be credited to the merchant after the user finished the transaction. The reward may be credited to the merchant in the form of a discount price of interchange fees as defined by the reward criteria of the user preference data. In this situation, the reward may be credited to the merchant when the user is performing the transaction. The value of interchange fees may be higher than the value of the reward. The value of interchange fees may be lower than the value of the reward. In some embodiments, the reward may be determined via the algorithm model 112 based on the transaction information and/or user preference data. The algorithm model 112 may be a machine leaning model. The dynamic reward may be associated with a particular level or degree of engagement between the user and the merchant 143. For example, if the merchant 143 is a charitable organization, and the user donates to the merchant at least twice per year and does not donate to any other organizations, then the level of engagement between the user and the merchant 143 may be higher than the level of engagement between the user and other organizations, and the dynamic reward to the merchant 143 may be higher than the reward to other organizations. Prior to step 302, or at any stage of directing transaction rewards, there may be a step of authenticating the user based on an identification of the user. Details of the step of authenticating the user are described elsewhere herein.

Step 303 may include a step of receiving a user instruction, via a user device associated with the user, to direct the reward to the merchant. The user instruction may include one or more instructions regarding one or more additional transactions between the user and the merchant 143, wherein the one or more additional transactions have transaction times after a transaction time of the transaction. For example, the user instruction may be a confirmation from the user to credit the reward to the merchant 143 for additional transactions occurring within a predefined period of time in the future. The predefined period of time may be defined by the reward criteria of the user preference data and may include at least a week, a month, a quarter, a year or longer. The predefined period of time may be at most a year, a quarter, a month, a week, or shorter. The user instruction may be selected or set by the user. The user instruction may be associated with and/or determined based on user preference data via the algorithm model 112. Details of the user preference data are described elsewhere herein.

Step 304 may include a step of transmitting, via the one or more processors, the reward to the merchant 143. Prior the transmitting the reward to the merchant 143, the notification engine 114 may generate an action item to allow the user to confirm the transmission of the reward to the merchant 143. The action item may be an interactive message that requires confirmation from the user to transmit the reward to the merchant 143 one time for a current transaction and/or multiple times for future transactions. After transmitting the reward to the merchant 143, if the merchant 143 accepts the reward, the notification engine 114 may generate a notification to the user notifying the user that the merchant 143 has accepted the reward.

Prior to step 304, or at any stage of directing transaction rewards, there may be a step of determining, via the one or more processors, that a reward balance associated with the user is below, equal to, or exceeds a predefined reward threshold. In this instance, the predefined reward threshold may be defined as part of the reward criteria of the user preference data. If the reward balance associated with the user is equal to or exceeds the predefined reward threshold, the reward may be transmitted to the merchant 143. If the reward balance associated with the user is less than the predefined reward threshold, the reward may not be transmitted to the merchant 143 or only part of the reward may be transmitted to the merchant 143. The predefined reward threshold may be set by the user or dynamically determined through an algorithm model. If the predefined reward threshold is set by the algorithm model 112, the algorithm model 112 may be a machine learning model. The machine learning model may be trained based on the transaction information, user instructions, and/or user preference data. Details of the machine learning model are described elsewhere herein.

Prior to step 304, or at any stage of directing transaction rewards, there may be a step of determining, via the one or more processors, that the transaction amount is equal to, above, or below a predefined transaction threshold. In this instance, the predefined transaction threshold may be defined as part of the reward criteria of the user preference data. If the transaction amount is equal to or below a predefined transaction threshold, the reward may be transmitted to the merchant 143. If the transaction amount exceeds a predefined transaction threshold, the reward may not be transmitted to the merchant or only part of the reward may be transmitted to the merchant. The predefined transaction threshold may be set by the user or dynamically determined through the algorithm model 112. If the predefined reward threshold is set by the algorithm model 112, the algorithm model 112 may be a machine learning model. The machine learning model may be trained based on the transaction information, user instructions, and/or user preference data. Details of the machine learning model are described elsewhere herein.

Prior to step 304, or at any stage of directing transaction rewards, there may be a step of determining, via the one or more processors, that an account balance of an account associated with the user is equal to, exceeds, or below a certain threshold. In this instance, the certain threshold may be defined as part of the reward criteria of the user preference data. If the account balance of an account associated with the user is equal to or below a certain threshold, the reward may not be transmitted to the merchant 143 or only part of the reward may be transmitted to the merchant 143. If the account balance of an account associated with the user exceeds a certain threshold, the reward may be transmitted to the merchant 143. The certain threshold may be set by the user or dynamically determined through the algorithm model 112. If the predefined reward threshold is set by the algorithm model 112, the algorithm model 112 may be a machine learning model. The machine learning model may be trained based on the transaction information, user instructions, and/or user preference data. Details of the machine learning model are described elsewhere herein.

The trained machine learning algorithm may include a regression-based model that accepts the transaction information, user preference data, and/or user instructions as input data. The trained machine learning algorithm may be part of the algorithm model 112. The trained machine learning algorithm may be of any suitable form, and may include, for example, a neural network. A neural network may be software representing a human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The trained machine learning algorithm may dynamically compute the reward criteria, including a predefined transaction threshold, a predefined reward threshold, or a certain threshold as a function of the transaction information, user instructions, and/or user preference data associated with one or more prior transactions, or one or more variables indicated in the input data. The one or more variables may vary relative to one or more dynamic factors, such as, for example, being derived from the transaction information, user instructions, and/or user preference data associated with one or more prior transactions. This function may be learned by training the machine learning algorithm with training sets. The machine learning algorithm may be trained by supervised, unsupervised, or semi-supervised learning using training sets comprising data of types similar to the type of data used as the model input. For example, the training set used to train the model may include any combination of the following: the transaction information, user instructions, and/or user preference data of a user; and the transaction information, user instructions, and/or user preference data of customers other than the user. Additionally, the training set used to train the model may further include other data related to the user (e.g., user's demographic information). Accordingly, the machine learning model may be trained to map input variables to a quantity or value of the transaction information, user instructions, and/or user preference data of the user. That is, the machine learning model may be trained to determine a quantity or value of future transaction information, user instructions, and/or user preference data of the user as a function of various input variables.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 4:
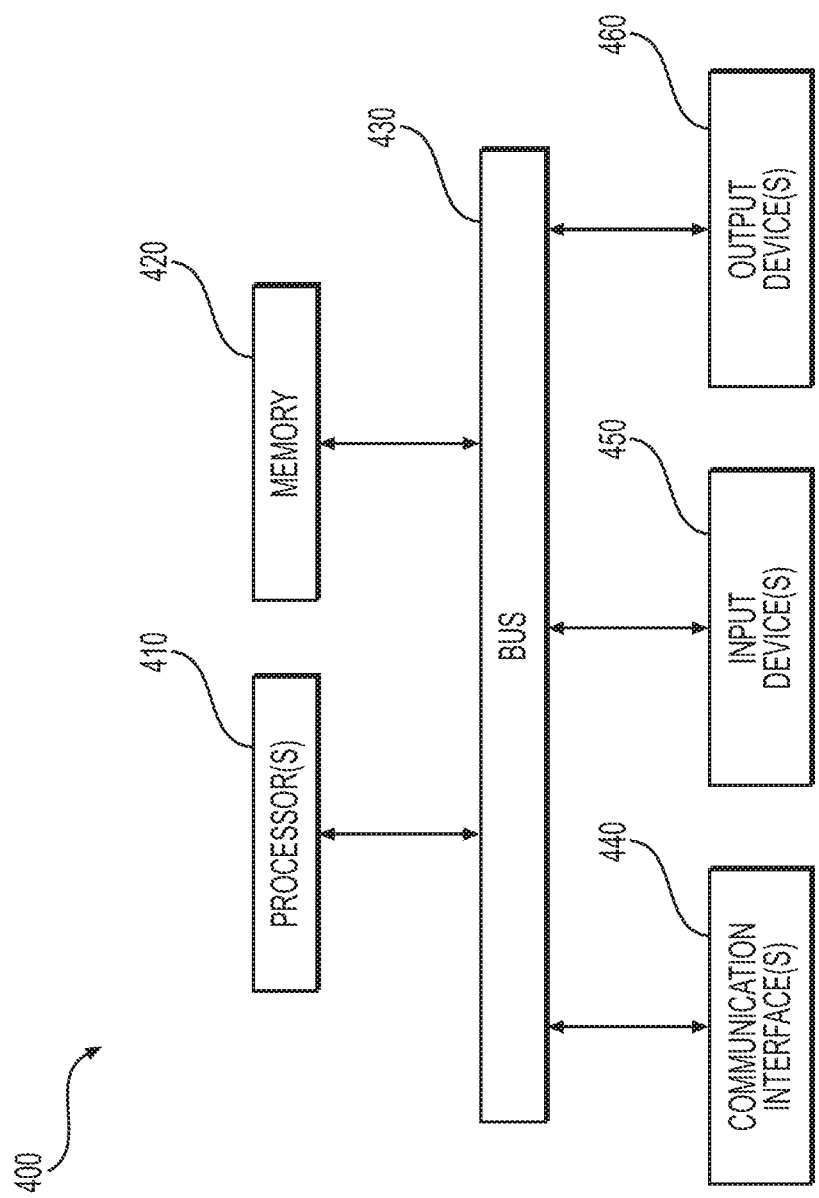
FIG. 4 depicts an example of a computing device, according to one or more embodiments.

FIG. 4 illustrates an example of a computing device 400 of a computer system, such as computer system 110. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for directing transaction rewards, the method comprising:
    receiving, via a user device associated with a user, user preference data regarding a preferred merchant list including one or more merchants and reward criteria for each of the one or more merchants, wherein the preferred merchant list defines a priority of the one or more merchants and the reward criteria defines a dynamic reward for each of the one or more merchants based on the priority on the preferred merchant list;
    receiving transaction information from a first merchant;
    determining, via one or more processors, if the first merchant is one of the one or more merchants on the preferred merchant list;
    in response to determining the first merchant is on the preferred merchant list, determining, via one or more processors, the dynamic reward for delivery to the first merchant based on the transaction information and the reward criteria; and transmitting, via the one or more processors, the dynamic reward to the first merchant.

2. The method of claim 1, wherein the reward criteria includes a predefined reward threshold associated with the first merchant, the method further including:
prior to the transmitting the dynamic reward to the first merchant, determining, via the one or more processors, that a reward balance associated with the user is equal to or exceeds the predefined reward threshold.

3. The method of claim 1, wherein the reward criteria includes a predefined transaction threshold associated with the first merchant, wherein the transaction information includes a transaction amount, the method further including:
prior to the transmitting the dynamic reward to the first merchant, determining, via the one or more processors, that the transaction amount is equal to or below a predefined transaction threshold.

4. The method of claim 1, further including:
prior to the transmitting the dynamic reward to the first merchant, determining, via the one or more processors, that an account balance of an account associated with the user is equal to or below a certain threshold.

5. The method of claim 1, wherein the user preference data includes merchant criteria for determining the one or more merchants in the preferred merchant list, the merchant criteria including a threshold income limit associated with the one or more merchants on the preferred merchant list.

6. The method of claim 5, further including:
determining, via the one or more processors, that the first merchant has an annual income below the threshold income limit for including the first merchant in the preferred merchant list.

7. The method of claim 1, wherein the user preference data includes merchant criteria for determining the one or more merchants in the preferred merchant list, the merchant criteria including a predefined geographic region or a threshold distance associated with the one or more merchants.

8. The method of claim 7, further including:
determining, via the one or more processors, that the first merchant is located within the predefined geographic region or within the threshold distance from a residence of the user for including the first merchant in the preferred merchant list.

9. The method of claim 8, wherein the user preference data further includes a limiting criteria, wherein the limiting criteria includes one or more of a specified time period, a specified transaction type, or a specified transaction amount.

10. The method of claim 1, wherein the dynamic reward is credited to the first merchant in the form of a credit against interchange fees.

11. A computer-implemented method for directing transaction rewards, the method comprising:
receiving transaction information associated with a transaction between a user and a merchant;
determining, via one or more processors, a dynamic reward associated with the transaction based on reward criteria defining a type and an amount of the dynamic reward;
receiving a user instruction, via a user device associated with the user, to direct the dynamic reward to the merchant upon confirming the merchant is included in a preferred merchant list; and
transmitting, via the one or more processors, the dynamic reward to the merchant, wherein the reward criteria defining the dynamic reward varies relative to each merchant included in the preferred merchant list.

12. The method of claim 11, wherein the reward criteria includes a predefined reward threshold, the method further including:
prior to the transmitting, determining, via the one or more processors, that a reward balance associated with the user is equal to or exceeds the predefined reward threshold.

13. The method of claim 11, wherein the user instruction includes one or more instructions regarding one or more additional transactions between the user and the merchant, wherein the one or more additional transactions have transaction times after a transaction time of the transaction.

14. The method of claim 11, wherein the reward criteria includes a predefined transaction threshold, the method further including:
prior to the transmitting the dynamic reward to the merchant, determining, via the one or more processors, that a transaction amount associated with the transaction is equal to or below the predefined transaction threshold.

15. The method of claim 11, further including:
prior to the transmitting the dynamic reward to the merchant, determining, via the one or more processors, that an account balance of an account associated with the user is equal to or below a certain threshold.

16. The method of claim 11, wherein the preferred merchant list includes one or more businesses with an annual income below an annual income limit.

17. The method of claim 11, wherein the preferred merchant list includes one or more businesses located within a predefined geographic region or within a threshold distance from a residence of the user.

18. The method of claim 11, wherein the merchant is a charitable organization.

19. The method of claim 11, wherein the dynamic reward is credited to the merchant in the form of a credit against interchange fees.

20. A computer system for directing transaction rewards, comprising:
a memory storing instructions; and
one or more processors configured to execute the instructions to perform operations including:
receiving transaction information associated with a transaction between a user and a merchant;
determining, via one or more processors, a dynamic reward associated with the transaction based on reward criteria defining a type and an amount of the dynamic reward;
receiving a user instruction, via a user device associated with the user, to direct the dynamic reward to the merchant upon confirming the merchant is included in a preferred merchant list; and
transmitting, via the one or more processors, the dynamic reward to the merchant, wherein the reward criteria defining the dynamic reward varies relative to each merchant included in the preferred merchant list.

* * * * *